United States Patent

Akedo et al.

[11] Patent Number: 5,918,642
[45] Date of Patent: Jul. 6, 1999

[54] FLEXIBLE SYNTHETIC RESIN TUBE

[75] Inventors: Youichi Akedo; Seiji Shiga; Tetsuya Inagake; Hitoya Kodama; Shoji Hattori; Yoshiki Yoshitomi, all of Kakegawa, Japan

[73] Assignee: Tigers Polymer Corporation, Toyonaka, Japan

[21] Appl. No.: 08/974,453

[22] Filed: Nov. 20, 1997

[30] Foreign Application Priority Data

Nov. 22, 1996 [JP] Japan .................................. 8-327558

[51] Int. Cl.$^6$ ...................................................... F16L 11/08
[52] U.S. Cl. ........................... 138/132; 138/144; 138/153; 138/129
[58] Field of Search .................................. 138/129, 125, 138/132, 144, 153

[56] References Cited

U.S. PATENT DOCUMENTS

| | | | |
|---|---|---|---|
| 1,310,715 | 7/1919 | Rose et al. | 138/132 |
| 3,479,670 | 11/1969 | Medell | 138/125 |
| 3,561,493 | 2/1971 | Maillard et al. | 138/137 |
| 3,584,656 | 6/1971 | Van Assendelet et al. | 138/137 |
| 4,098,298 | 7/1978 | Vohrer | 138/132 |
| 4,140,154 | 2/1979 | Kanao | 138/132 |
| 4,275,769 | 6/1981 | Cooke | 138/125 |
| 4,587,145 | 5/1986 | Kanao | 138/132 |
| 5,665,831 | 9/1997 | Neuenscwander et al. | 525/415 |

OTHER PUBLICATIONS

Japanese Utility Model Publication No. 7939/ (English translation of claim is enclosed), Feb./1974.

*Primary Examiner*—Denise L. Ferensic
*Assistant Examiner*—James F. Hook
*Attorney, Agent, or Firm*—Pillsbury Madison & Sutro LLP

[57] ABSTRACT

A flexible synthetic resin tube is provided by uniting an inner layer of a polyether-series thermoplastic polyurethane resin with a hard synthetic resin spiral reinforcement (e.g. a hard vinyl chloride resin) or a soft synthetic resin outer layer (e.g. a soft vinyl chloride resin), through an interposed adhesive intermediate resin layer. The polyurethane resin includes a resin having a diol composed of a tetramethylenoxy unit as a polyol component. The spiral reinforcement may be buried in the outer layer. The intermediate resin layer may comprise a mixture of the polyether-series thermoplastic polyurethane resin, and the synthetic resin for the spiral reinforcement or the outer layer. This tube imparts an enhanced hydrolysis-resistant property to the polyurethane resin forming the inner layer, and an improved adhesive strength between the inner layer and the spiral reinforcement or the outer layer.

8 Claims, 1 Drawing Sheet

FLEXIBLE SYNTHETIC RESIN TUBE

FIELD OF THE INVENTION

The present invention relates to a flexible synthetic resin tube or hose, the inner layer of which is formed of a thermoplastic polyurethane resin.

BACKGROUND OF THE INVENTION

Japanese Utility Model Publication No. 7939/1974 (JP-Y-49-7939) discloses a flexible synthetic resin tube which is constituted with an inner layer of a thermoplastic polyurethane resin and an outer layer of a plasticized or soft vinyl chloride resin, the both layers being thermally fused and bonded together to improve the abrasion-resistant property of the tube. Disclosed in one of the embodiments is a flexible tube which has a spiral core of a non-plasticized or hard poly(vinyl chloride) resin embedded or buried in the boundary area between the inner layer and the outer layer.

However, this literature fails to disclose the details of the material for forming the inner layer of the flexible synthetic resin tube, simply referring to a thermoplastic polyurethane resin as such. If the polyurethane resin is a polyester-series thermoplastic polyurethane resin, such selection utterly failing to consider hydrolysis-resistance of the resin, the thermoplastic polyurethane resin is hydrolysed after exposed to a high temperature and high humidity for a long time. As a result, physical properties of the tube, such as mechanical strength, flexibility, and elasticity, are likely to deteriorate.

Suppose that the material is a polyether-series thermoplastic polyurethane resin, it is practically impossible to fuse this resin thermally directly with a soft vinyl chloride resin to unite these resins, and to apply the resulting synthetic resin tube to various uses. For this reason or others, this literature proposes to use, as the soft poly(vinyl chloride) resin to constitute the outer layer, a soft poly(vinyl chloride) resin modified with a specific plasticizer or a carboxyl group-containing copolymer of vinyl acetate and vinyl chloride, in order to improve thermofusability or thermal-fusion property to the polyurethane resin.

SUMMARY OF THE INVENTION

It is, therefore, an object of the present invention to provide a flexible synthetic resin tube in which a thermoplastic polyurethane resin forming an inner layer not only has an enhanced hydrolysis-resistant property but also firmly bonds together with a synthetic resin forming a hard spiral reinforcement or an outer layer.

It is another object of the present invention to provide a flexible synthetic resin tube in which a thermoplastic polyurethane resin forming an inner layer firmly bonds or adheres to a hard spiral reinforcement or an outer layer, without deteriorating its excellent characteristics such as mechanical strength, flexibility, elasticity, and abrasion-resistance.

It is a further object of the present invention to provide a flexible synthetic resin tube having an inner layer and an outer layer firmly bonded or adhered to each other, which is obtainable without employing a modified soft poly(vinyl chloride) resin as the synthetic resin for the outer layer, even when a polyether-series thermoplastic polyurethane resin is employed.

The present invention has solved the above problems by providing (A) a flexible synthetic resin tube which comprises an inner layer composed of a polyether-series thermoplastic polyurethane resin, an adhesive intermediate resin layer, and a spiral reinforcement composed of a synthetic resin, the intermediate resin layer interposed between the inner layer and the spiral reinforcement acting to bond and unite these members (i.e. the inner layer and the reinforcement); and (B) a flexible synthetic resin tube which comprises an inner layer composed of a polyether-series thermoplastic polyurethane resin, an adhesive intermediate resin layer, and an outer layer composed of a synthetic resin, the intermediate resin layer interposed between the inner layer and the outer layer acting to bond and unite the two layers. The thermoplastic polyurethane resin may comprise a polyurethane resin obtainable by reacting a polyol component comprising at least an tetramethylenoxy unit with a polyisocyanate component. The spiral reinforcement, which may be embedded or buried in the outer layer, may comprise a non-plasticized or hard synthetic resin (e.g. a hard vinyl chloride resin, i.e. a non-plasticized vinyl chloride resin), and the outer layer may comprise a plasticized or soft synthetic resin (e.g. a soft vinyl chloride resin, i.e. a plasticized vinyl chloride resin). The adhesive intermediate resin layer may comprise a blended resin of a polyether-series thermoplastic polyurethane resin and a synthetic resin constituting the spiral reinforcement or the outer layer.

DETAILED DESCRIPTION OF THE INVENTION

Hereinafter, one embodiment of the flexible synthetic resin tube of the present invention is described in detail with reference to the drawings where necessary.

Figure 1:
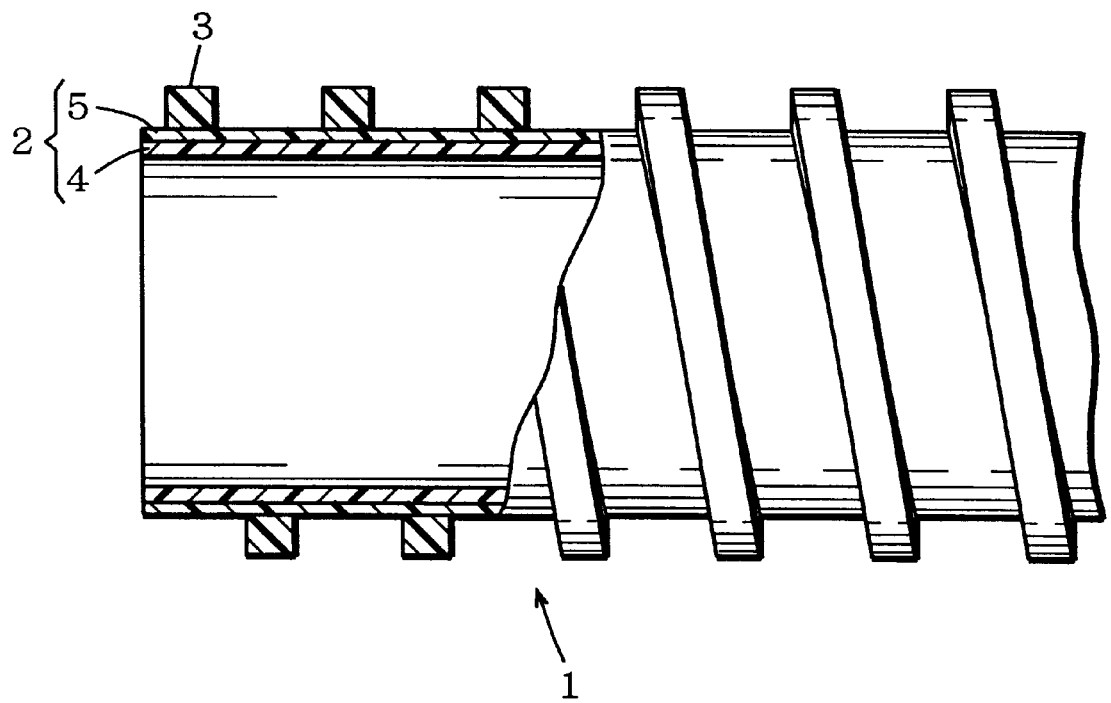
FIG. 1 is a partial cross sectional view showing one embodiment of the flexible synthetic resin tube of the present invention.

Referring now to FIG. 1, there is shown a flexible synthetic resin tube (or hose) 1 which is constituted with a tube wall 2 made of a plasticized or soft synthetic resin, and a spiral reinforcement 3 spirally attached to the outer surface of the tube wall 2 and made of a non-plasticized or hard synthetic resin for shape-retention and reinforcement of the tube.

The tube wall 2 has a lamination structure comprising an inner layer 4 made of a polyether-series thermoplastic polyurethane resin, and an adhesive intermediate resin layer 5. The spiral reinforcement 3 is made of a hard vinyl chloride resin. Each of the inner layer 4 and the spiral reinforcement 3 is thermally fused to the adhesive intermediate resin layer 5, whereby the inner layer 4 and the spiral reinforcement 3 are bonded and united through the adhesive intermediate resin layer 5 to give the flexible synthetic resin tube 1.

Thermoplastic polyurethane resins are classified according to the species of a polyol component used as a soft segment of a polyurethane. The polyether-series thermoplastic polyurethane resin for forming the inner layer indicates a thermoplastic polyurethane resin (TPU) whose polyol component is a poly(ether polyol).

As the polyisocyanate components to form the thermoplastic polyurethane resin, there may be exemplified:

aromatic polyisocyanates (e.g. diisocyanates including m-phenylene diisocyanate, p-phenylene diisocyanate, TDI (2,4-tolylene diisocyanate, 2,6-tolylene diisocyanate, etc.), diphenylmethane-4,4'-diisocyanate (MDI), a polymeric MDI, tolidine diisocyanate (diphenylmethane-3,3'-dimethyl-4,4'-diisocyanate), and 1,5-naphthalene diisocyanate; polyisocyanates including triphenylmethane triisocyanate);

araliphatic polyisocyanates (e.g. diisocyanates including 1,3-xylylene diisocyanate, 1,4-xylylene diisocyanate, and tetramethylxylylene diisocyanate; polyisocyanates including 1,3,5-triisocyanate methylbenzene);

alicyclic polyisocyanates (e.g. diisocyanates including isophorone diisocyanate, dicyclohexylmethane-4,4'-diisocyanate, cyclohexane-1,4-diisocyanate; polyisocyanates including 1,3,5-triisocyanatecyclohexane); and aliphatic polyisocyanates (e.g. diisocyanates including 1,6-hexamethylene diisocyanate, 2,2,4-trimethylhexamethylene diisocyanate, and lysine diisocyanate; polyisocyanates including 1,3,6-hexamethylene triisocyanate).

These polyisocyanate components may be used singly or as a mixture of two or more species. Among them, a diisocyanate component may be practically used.

The polyisocyanate component may be any of an adduct being formed by addition of a polyisocyanate to a polyhydric alcohol and having an isocyanate group at the terminal, a cyanurate formed by a Buret reaction, a dimer, or a trimer.

As the polyisocyanate component, use may be practically made of at least one member of aromatic diisocyanates and alicyclic diisocyanates, particularly aromatic diisocyanates (TDI, MDI, polymeric MDI, etc.).

Examples of the poly(ether polyol) used as the polyol component include poly(ether diols) having a $C_{2-4}$ alkylenoxy unit, such as poly(ethylene glycol), poly(propylene glycol), polyoxytetramethylene glycol; copolymers of these diols (e.g. a poly(ethylene oxide)-poly(propylene oxide) block copolymer, a propylene oxide-tetrahydrofuran copolymer, a poly(propylene oxide)-poly(tetramethylene glycol) block copolymer); and adducts of an alkylene oxide (e.g. $C_{2-4}$ alkylene oxides such as ethylene oxide, butylene oxide, propylene oxide, and tetrahydrofuran) with a polyhydric alcohol as the initiator. As such initiators, there may be mentioned, for instance, aliphatic polyols (e.g. $C_{2-10}$ alkylene diols, glycerin, trimethylolpropane, pentaerythritol), alicyclic polyhydric alcohols (e.g. alicyclic diols such as 1,4-cyclohexanedimethylol and a hydrogenated bisphenol A), and aromatic polyhydric alcohols (e.g. aromatic diols such as 2,2-bis-(2-hydroxyethylphenyl) propane).

A desirable polyol component comprises at least a tetramethylenoxy unit. Particularly desired is a polyoxytetramehtylene glycol-series polyol comprising a tetramethylenoxy unit (particularly, a polyoxytetramethylene unit) in a proportion of 50 to 100% by weight, preferably 75 to 100% by weight, and more preferably 80 to 100% by weight.

The polyether-series thermoplastic polyurethane resin may be used as a mixture optionally blended with various thermoplastic resins, for example, as a mixture with a poly(vinyl chloride) resin, a polyester resin, and a polyamide resin, unless such incorporation alters the properties of the resin to a great extent. The proportion of the thermoplastic polyurethane resin relative to the thermoplastic resin is such that the former/the latter is, for instance, about 50/50 to 100/0 (by weight), and preferably about 75/25 to 100/0 (by weight).

In the case of a polyester-series thermoplastic polyurethane resin containing a poly(ester polyol) as the polyol component, its ester bond is hydrolysed due to exposure to warm or hot water, or saturated vapour (steam), so that the physical properties of the resin are deteriorated. On the other hand, the polyether-series thermoplastic polyurethane resin forming the inner layer 4, which has a different chemical structure from that of the polyester-series thermoplastic polyurethane resin, shows a much greater degree of physical or chemical resistance to hydrolysis. In addition, the polyether-series resin is highly resistant to abrasion, and is also excellent in other characteristics such as mechanical strength, flexibility, and elasticity. In the present invention, a specific resin is selected among the thermoplastic polyurethane resins to form the inner layer of the flexible synthetic resin tube. The thus obtained tube exhibits excellent functions in a wide range of applications without losing any of the distinctive characteristics of the thermoplastic polyurethane resin.

Incidentally, it is generally difficult to bond or adhere the polyether-series thermoplastic polyurethane resin directly to the other kinds of resin (e.g. a vinyl chloride resin). The present invention has overcome this problem by interposing the adhesive intermediate resin layer between the inner layer and the spiral reinforcement or the outer layer to improve the adhesive strength between them to a great extent.

As the adhesive intermediate resin, any resin can be employed as far as being adhesive to both of the polyether-series thermoplastic polyurethane resin, and the hard synthetic resin forming the spiral reinforcement (in this embodiment, a vinyl chloride resin). In the present embodiment, the resin for the intermediate resin layer 5 comprises a blended resin (mixture) of the polyether-series thermoplastic polyurethane resin and the hard synthetic resin for forming the spiral reinforcement. The proportion of the polyether-series thermoplastic polyurethane resin relative to the resin (e.g. vinyl chloride resin) is such that the former/the latter is, for instance, about 20/80 to 80/20 (percent by weight), preferably about 30/70 to 70/30 (percent by weight), and more preferably about 40/60 to 60/40 (percent by weight). If the ratio deviates from the above range, the blended resin shows a lower adhesive property, failing to bond and unite the tube wall 2 with the spiral reinforcement 3.

Figure 2:
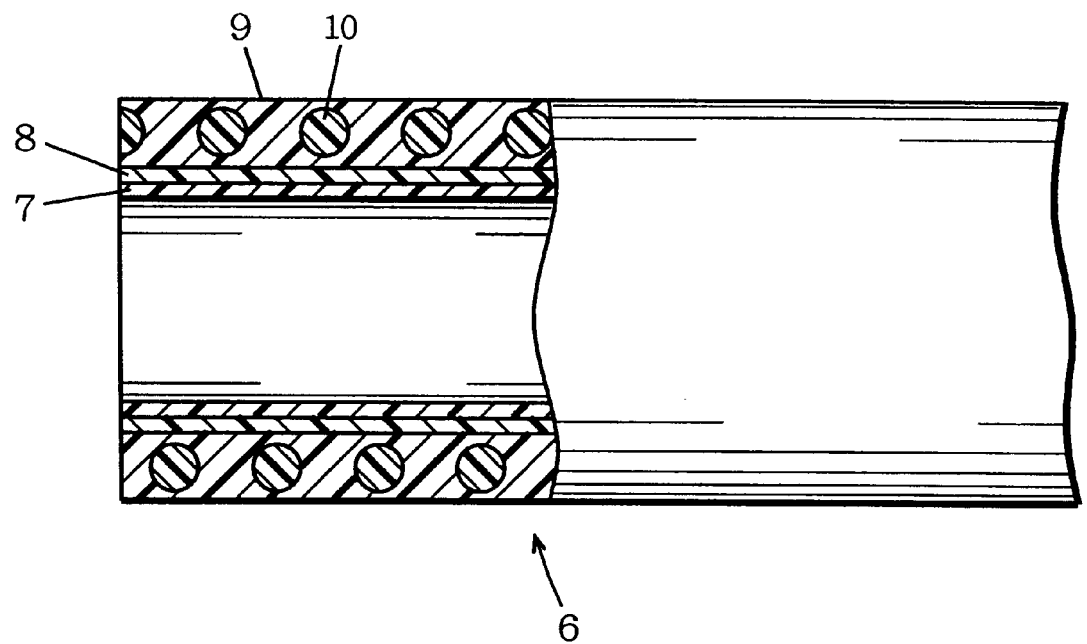
FIG. 2 is a partial cross sectional view showing another embodiment of the flexible synthetic resin tube of the present invention.

FIG. 2 is a partial cross sectional view of another embodiment of the present invention. In this embodiment, a spiral reinforcing core (a spiral reinforcement) 10 made of a hard synthetic resin is embedded or buried in an outer layer 9 made of a soft synthetic resin. A flexible synthetic resin tube (or hose) 6 comprises an inner layer 7 composed of the polyether-series thermoplastic polyurethane resin, an adhesive intermediate resin layer 8, and the outer layer 9, the intermediate resin layer being interposed between the inner layer 7 and the inner surface of the outer layer 9 to bond and unite these layers.

In this second embodiment, the outer layer 9 is formed of a soft vinyl chloride resin, and the spiral reinforcing core 10 is made of a hard vinyl chloride and buried in the soft resin. Similar to the first embodiment, the adhesive intermediate resin layer 8 comprises a blended resin of a polyether-series thermoplastic polyurethane resin and a vinyl chloride resin, and the inner layer 7 comprises the similar polyether-series thermoplastic polyurethane resin. The inner layer 7 and the outer layer 9 are bonded to each other, with interposition of the adhesive intermediate resin layer 8, to make the flexible synthetic resin tube (or hose) 6.

In the above embodiments, the polyether-series thermoplastic polyurethane resin is bonded to the spiral reinforcement or the outer layer made of a vinyl chloride resin, however, the present invention should not be limited to such a combination. By way of illustration, the hard synthetic resin for forming the spiral reinforcement also includes polypropylene and other propylene-series resins, a vinyl chloride-acrylonitrile copolymer, etc. The soft synthetic resin for the outer layer includes ethylene-series or ethylenic resins such as a low-density polyethylene, a medium-density polyethylene, a high-density polyethylene, a linear low-density polyethylene; soft resins such as a vinyl chloride-vinyl acetate copolymer and an ethylene-vinyl acetate copolymer; thermoplastic elastomers such as an ethylene-propylene block copolymer and a thermoplastic polyester elastomer; etc.

The species of the adhesive intermediate resin, which is interposed between the inner layer of the polyether-series thermoplastic polyurethane resin, and the spiral reinforcement or the outer layer of the above-mentioned resins, is not particularly restricted so far as the intermediate resin is capable of adhering to both the inner layer and the spiral reinforcement or the outer layer to unite these elements or members. As such intermediate resins, there may be exemplified adhesive resins (or, adhesives) such as polyester-series resins (e.g. a copolymerized polyester resin), polyamide-series resins, acrylic resins, urethane-series resins, modified olefinic resins (e.g. polyethylene, polypropylene and other resins modified with a carboxyl group, an acid anhydride group, an epoxy group or the like), and blends of these resins (or, blended adhesives). A preferable intermediate resin is a blended resin (mixture) of the polyether-series thermoplastic polyurethane resin for forming the inner layer and the synthetic resin for forming the spiral reinforcement or the outer layer. The blending proportion can be suitably selected from the above-defined range [namely, (thermoplastic polyurethane resin)/(synthetic resin) equals about 20/80 to 80/20 (percent by weight)]. By way of example, for the spiral reinforcement or the outer layer made of the polyolefinic resin, a resin being adhesive to both the polyether-series thermoplastic polyurethane resin and the polyolefinic resin can be used as the adhesive intermediate resin, specific examples of which include a blended resin of the polyether-series thermoplastic polyurethane resin and a modified polyolefin resin (e.g. a modified olefinic resin selected from polyethylenes, polypropylenes or copolymers thereof, each having a modifying group such as a carboxyl group, an acid anhydride group, and an epoxy group).

The inner layer, the spiral reinforcement, and the outer layer may contain various additives such as stabilizers (an antioxidant, an ultraviolet ray-absorber, a thermostabilizer, etc.), softening agents, plasticizers, fillers, slipping agents, colouring agents, flame-retardants, antistatics, and so on.

The flexible tube or hose of the present invention is produced according to a conventional manner, for example, by:

(1) a method comprising the steps of extrusion-moulding the polyether-series thermoplastic polyurethane resin and the intermediate resin in the form of a laminated tape, if necessary, by joining these resins in a die; laminating the tape on a moulding former (a rod-shaped moulding die) to form a tube or hose; and, while rotating the tube, coiling (spirally laminating) an extrusion-moulded spiral reinforcement of the hard resin on the surface of the intermediate resin layer of the tube, to give an object flexible tube or hose, or (2) a method comprising the steps of joining a linear hard resin reinforcement and a soft resin tape in a die and extrusion-moulding the mixture in the form of a composite tape having the linear reinforcement embedded therein; and, while rotating the tube formed in the same manner as above, coiling (spirally laminating) the thus obtained composite tape on the surface of the intermediate resin layer of the tube.

The flexible synthetic resin tube or hose of the present invention is characterised in that the inner layer of the polyether-series thermoplastic polyurethane resin is firmly laminated on the outer layer through the interposed adhesive intermediate resin. This structure imparts an excellent hydrolysis-resistant property and a water-proof property to the flexible tube or hose, with maintaining the distinctive properties characteristic of thermoplastic polyurethane resins for a long period. Thus, this flexible synthetic resin tube is useful in a wider field of application, being of great utility value. To take advantage of its excellent flexibility and durability, the flexible synthetic resin tube can be used, for example, as a hose for carrying various kinds of fluids (a hose for electric vacuum cleaners, electric washing machines, etc.), or a hose for conveying solid substances such as muddy water, sand, sludge, and unhardened concrete. Particularly, this tube is used with great advantage in construction or engineering works as a hose for conveying liquid which contains solid substances.

What is claimed is:

1. A flexible synthetic resin tube which comprises an inner layer composed of a polyether-series thermoplastic polyurethane resin, an adhesive intermediate resin layer, and a spiral reinforcement comprising a hard or non-plasticized synthetic resin or an outer layer composed of a soft or plasticized synthetic resin, wherein (1) said inner layer is united with the spiral reinforcement through the interposed intermediate resin layer, or (2) said inner layer is united with the outer layer through the interposed intermediate resin layer and said spiral reinforcement is buried in said outer layer.

2. A flexible synthetic resin tube as claimed in claim 1, wherein said thermoplastic polyurethane resin is a polyurethane resin obtainable by reacting a polyol component comprising at least a tetramethylenoxy unit with a polyisocyanate component.

3. A flexible synthetic resin tube as claimed in claim 1, wherein said thermoplastic polyurethane resin is a polyurethane resin obtainable by reacting a diol component containing 50 to 100% by weight of the tetramethylenoxy unit with a diisocyanate component.

4. A flexible synthetic resin tube as claimed in claim 1, wherein said spiral reinforcement comprises a non-plasticized vinyl chloride resin.

5. A flexible synthetic resin tube as claimed in claim 1, wherein said outer layer comprises a plasticized vinyl chloride resin.

6. A flexible synthetic resin tube as claimed in claim 1, wherein said adhesive intermediate resin layer comprises a mixture of the polyether-series thermoplastic polyurethane resin, and the synthetic resin for forming the spiral reinforcement or the outer layer.

7. A flexible synthetic resin tube as claimed in claim 1, wherein said adhesive intermediate resin layer comprises a mixture of the polyether-series thermoplastic polyurethane resin and a vinyl chloride resin.

8. A flexible synthetic resin tube as claimed in claim 1, which comprises:

an inner layer composed of a polyurethane resin obtainable by reacting a diol component containing 50 to 100% by weight of a tetramethylenoxy unit with a diisocyanate component, an outer layer composed of a plasticized vinyl chloride resin, and an intermediate resin layer comprising a mixture of 20 to 80% by weight of the polyether-series thermoplastic polyurethane resin and 80 to 20% by weight of the vinyl chloride resin.

* * * * *